US006443239B1

(12) United States Patent
Izumisawa

(10) Patent No.: US 6,443,239 B1
(45) Date of Patent: Sep. 3, 2002

(54) PNEUMATIC ROTARY TOOL

(75) Inventor: Osamu Izumisawa, Tokyo (JP)

(73) Assignee: S.P. Air Kabusiki Kaisha, Kamiminochi (JP)

( * ) Notice: Subject to any disclaimer, the term of this patent is extended or adjusted under 35 U.S.C. 154(b) by 0 days.

(21) Appl. No.: 09/515,744

(22) Filed: Feb. 29, 2000

(51) Int. Cl.[7] .................................................. B23B 45/04
(52) U.S. Cl. ........................................ 173/169; 173/168
(58) Field of Search ................................. 173/168, 169; 137/601.01, 601.12, 599.16, 630.14

(56) References Cited

U.S. PATENT DOCUMENTS

| | | | | |
|---|---|---|---|---|
| 2,369,104 A | | 2/1945 | Fredrickson | |
| 2,829,285 A | | 4/1958 | Steiner et al. | |
| D205,091 S | | 6/1966 | Averitt | |
| 3,352,368 A | | 11/1967 | Maffey, Jr. | |
| 3,443,646 A | * | 5/1969 | Baker et al. ................ | 173/169 |
| 3,605,914 A | | 9/1971 | Kramer | |

(List continued on next page.)

FOREIGN PATENT DOCUMENTS

| | | |
|---|---|---|
| EP | 0 372 376 | 11/1989 |
| EP | 0849052 A2 | 6/1998 |
| WO | WO 94/04312 | 3/1994 |

OTHER PUBLICATIONS

Ingersoll–Rand publication entitled, “Ingersoll–Rand Automotive Power Tools Catalog,” 1996, pp. 1, 8–9, 11–17, 23 and 41.
Mermaid Distributors publication entitled, “Shinano Pneumatic Ind. Inc., ” published at least as early as Jan. 26, 2000.
Conventrys publication entitled, “Conventrys SP Air,” Sep. 1994.
SP Air Corporation publication entitled, “½ [inch] Square Drive Impact Wrenches,” published at least as early as Jan. 26, 2000.
Shinano Pneumatic Industries Inc. publication entitled, “SP Air,” published at least as early as Jan. 26, 2000.
Shinano Pneumatic Industries Inc. publication entitled, “SP Pneumatic Tools,” published at least as early as Jan. 26, 2000, pp. 1–2, 7–12, and 15.
Burson Auto Parts publication entitled, “Burson Auto Parts SP Air,” 1994.
Viking Air Tools untitled publication, Aug. 1990.
PCT European Search Report, Mar. 15, 2002, The Hague, Examiner U. Matzdorf, 2 pages.

*Primary Examiner*—Scott A. Smith
*Assistant Examiner*—Chukwurah Nathaniel
(74) *Attorney, Agent, or Firm*—Senniger, Powers, Leavitt & Roedel

(57) ABSTRACT

A pneumatic rotary tool including a housing and an output shaft projecting from the housing for transmitting torque to an object. An air motor drives rotation of the output shaft in the forward and reverse directions. Air passages extend from an air inlet to the motor for delivering pressurized air to the motor. A spring biases the lower portion of a valve within the air passage in a closed position, to restrict the flow of air through the air passage. The upper portion of the valve comprises a stem. When an operator squeezes a trigger on the pneumatic rotary tool, a deflector connected to the trigger deflects the stem to a first angularly deflected position, the valve thereby allows a relatively low rate of air flow to the motor for low-speed operation thereof. As the operator continues to squeeze the trigger, the stem is deflected to a second angularly deflected position, allowing a relatively high rate of air flow to the motor for high-speed operation thereof.

18 Claims, 5 Drawing Sheets

U.S. PATENT DOCUMENTS

| | | | | |
|---|---|---|---|---|
| 3,661,217 A | | 5/1972 | Maurer | |
| 3,833,068 A | | 9/1974 | Hall | |
| 3,880,245 A | | 4/1975 | Anderson, Jr. | |
| 3,951,217 A | | 4/1976 | Wallace et al. | |
| D256,711 S | | 9/1980 | Kitagawa et al. | |
| D256,980 S | | 9/1980 | Adams et al. | |
| 4,258,799 A | * | 3/1981 | Elkman | 173/169 |
| 4,379,492 A | | 4/1983 | Hiraoka | |
| 4,476,942 A | * | 10/1984 | Elkin | 173/169 |
| D288,769 S | | 3/1987 | Doman | |
| D288,770 S | | 3/1987 | Doman | |
| D289,136 S | | 4/1987 | Doman | |
| 4,778,015 A | | 10/1988 | Jacobsson | |
| D299,411 S | | 1/1989 | Porcaro | |
| 4,839,995 A | | 6/1989 | Hutchins | |
| D313,736 S | | 1/1991 | Boliver et al. | |
| D316,019 S | | 4/1991 | Belanger | |
| D319,763 S | | 9/1991 | Reiferscheid | |
| 5,083,619 A | | 1/1992 | Giardino et al. | |
| D324,801 S | | 3/1992 | Caskey et al. | |
| D324,802 S | | 3/1992 | Caskey et al. | |
| D327,830 S | | 7/1992 | Fisher | |
| D329,580 S | | 9/1992 | Sasaki et al. | |
| 5,199,505 A | | 4/1993 | Izumisawa | |
| 5,269,733 A | | 12/1993 | Anthony, III | |
| D344,000 S | | 2/1994 | Shibata et al. | |
| 5,292,352 A | | 3/1994 | Rudolf et al. | |
| 5,377,769 A | | 1/1995 | Hasuo et al. | |
| D360,129 S | | 7/1995 | Guegan et al. | |
| 5,441,450 A | | 8/1995 | Fein et al. | |
| D364,544 S | | 11/1995 | Izumisawa | |
| 5,535,867 A | | 7/1996 | Coccaro et al. | |
| RE35,617 E | | 9/1997 | Krivec | |
| D388,678 S | | 1/1998 | Bantly et al. | |
| D393,580 S | | 4/1998 | Bantly et al. | |
| D394,995 S | | 6/1998 | Cooper | |
| D400,074 S | | 10/1998 | Cooper | |
| D403,564 S | | 1/1999 | Izumisawa | |
| 5,918,686 A | | 7/1999 | Izumisawa | |

* cited by examiner

PNEUMATIC ROTARY TOOL

BACKGROUND OF THE INVENTION

This invention relates to a pneumatic rotary tool, and more particularly to an air inlet valve construction for such a tool.

The invention has been developed as an improvement on the pneumatic rotary tool disclosed in U.S. Pat. No. 5,918,686 issued Jul. 6, 1999, entitled Pneumatic Rotary Tool, incorporated herein by reference, hereinafter referred to as the '686 patent.

In the tool disclosed in the '686 patent, the flow of air to the air motor thereof is under primary control of a trigger-operated air valve (indicated at 65 in the '686 patent), which is referred to in the patent as the primary air valve. Paraphrasing lines 37–45, column 7 of the patent, in using the tool the operator, using his index finger, squeezes the trigger to open the valve and the speed at which the tool operates depends on how far inward he pulls the trigger. While the tool has been generally satisfactory, inexperienced operators may encounter some difficulty in squeezing the trigger to attain and maintain a relatively low speed when that is needed for the work to be performed.

SUMMARY OF THE INVENTION

Accordingly, among the several objects of this invention may be noted the provision of a tool of the type shown in the '686 patent improved to the extent of making it easier for the user to attain and maintain a low speed of the air motor, whereby the user may readily attain and maintain a particular low-speed setting or a high speed setting, as needed for the job at hand; the provision in the tool of valve means including the primary air valve of the '686 patent invention for the dual stage speed purpose; the provision of a pistol-grip type of tool such as shown in the '686 patent wherein the pull on the trigger controls the speed setting; and the provision of valve means for the stated purpose of economical construction and capable of economic assembly.

In general, a pneumatic rotary hand tool of this invention comprises a housing having an air motor therein, the housing having an inlet passage for flow of air to the motor for driving it and valve means for controlling the flow of air through the inlet passage. The inlet passage has an upstream facing valve seat, the valve means comprising members in the passage upstream of the seat one of which has a stem extending downstream therefrom past the seat. A spring biases said members in downstream direction to a closed position with respect to the seat. The stem extends generally axially in said passage in said closed position of said members. A deflector for the stem is operable by one holding the tool for deflecting the stem angularly from said generally axial position to a first angularly deflected position wherein said valve members establish flow of air to the motor at a relatively low rate for low-speed operation thereof and further to a second farther angularly deflected position wherein said valve members establish flow of air to the motor at a relatively high rate for high-speed operation thereof.

Other objects and features will be in part apparent and in part pointed out hereinafter.

BRIEF DESCRIPTION OF THE DRAWINGS

Corresponding reference characters indicate corresponding parts throughout several views of the drawings.

DETAILED DESCRIPTION

Figure 1:
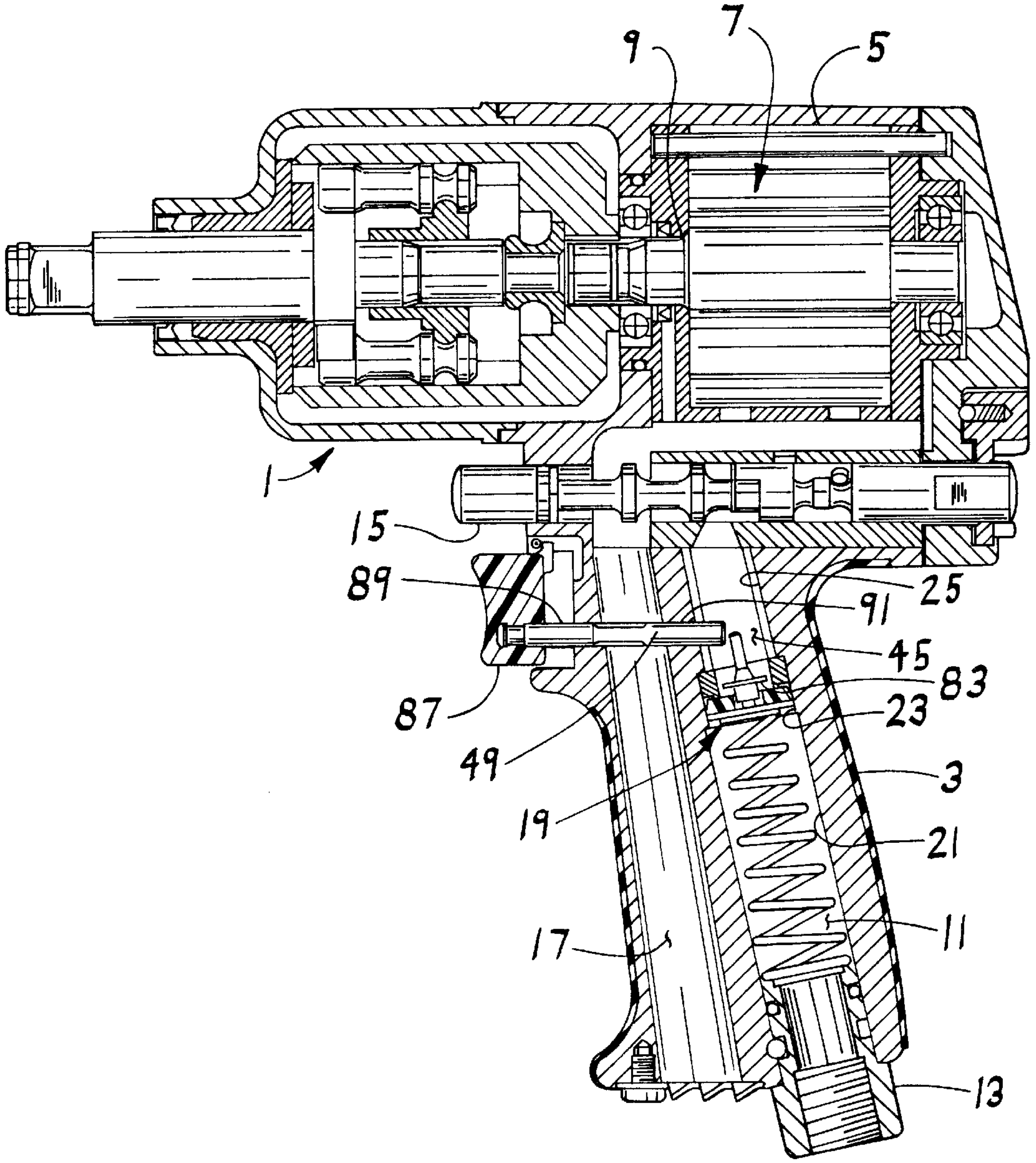
FIG. 1 is a generally schematic vertical section of a pneumatic rotary hand tool similar to FIG. 2 of the '686 patent but showing valve means in accordance with this invention instead of the valve indicated at 65 in the '686 patent, the valve means being shown in off position wherein it completely blocks the flow of air.

Referring to the drawings, first more particularly to FIG. 1, a pneumatic rotary hand tool having novel primary valve means of this invention is shown as comprising a pistol-like housing generally designated 1 having a pistol grip or handle 3 and a chamber 5 above the grip 3 in which reposes an air motor 7 for driving a shaft 9 for a tool (not shown) extending out of the chamber 5. In the grip 3 is an air inlet passage designated 11 in its entirety for flow of air under pressure supplied thereto via a flexible hose (not shown) connected to a swivelling fitting 13 at the entrance end of the passage. At 15 is indicated a combination selector valve for selection of operation of the air motor 7 in forward or reverse direction and selection of the torque generated by the air motor. In the grip 3 alongside the inlet passage 11 is an air exhaust passage 17. All this is essentially disclosed in the '686 patent, to which reference may be had for details (not critical so far as the present invention is concerned). It is to be understood that the selector valve 15 and swivelling fitting 13 may be eliminated without departing from the scope of the present invention. The present invention involves the provision in the inlet passage 11 of the valve means designated in its entirety by the reference numeral 19, replacing the primary air valve designated by the reference numeral 65 in the '686 patent, said valve means 19 being trigger-operable as will be subsequently described.

The inlet passage 11 is formed by a lower counterbore 21 extending up from the lower end of the grip 3 more than half way up the grip to a second counterbore 23 of slightly smaller diameter than the lower counterbore, and a bore 25 extending up from the second counterbore having a relatively thin-walled tubular insert 27 secured in the bore 25 as by being press-fitted therein extending up from the upper end of the second counterbore. The upper end of the second counterbore and the lower end of the tubular insert define a upstream-facing (downward facing) shoulder 29. A ring 31 is secured in the second counterbore 23 up against the shoulder 29, as by being press-fitted in the second counterbore, said ring having an annular boss 33 projecting downwardly therefrom surrounding the central opening 35 in the ring (and the boss) constituting a relatively narrow annular valve seat. As shown, the opening 35 is very slightly less than the internal diameter of the tubular insert 27.

Figure 2:
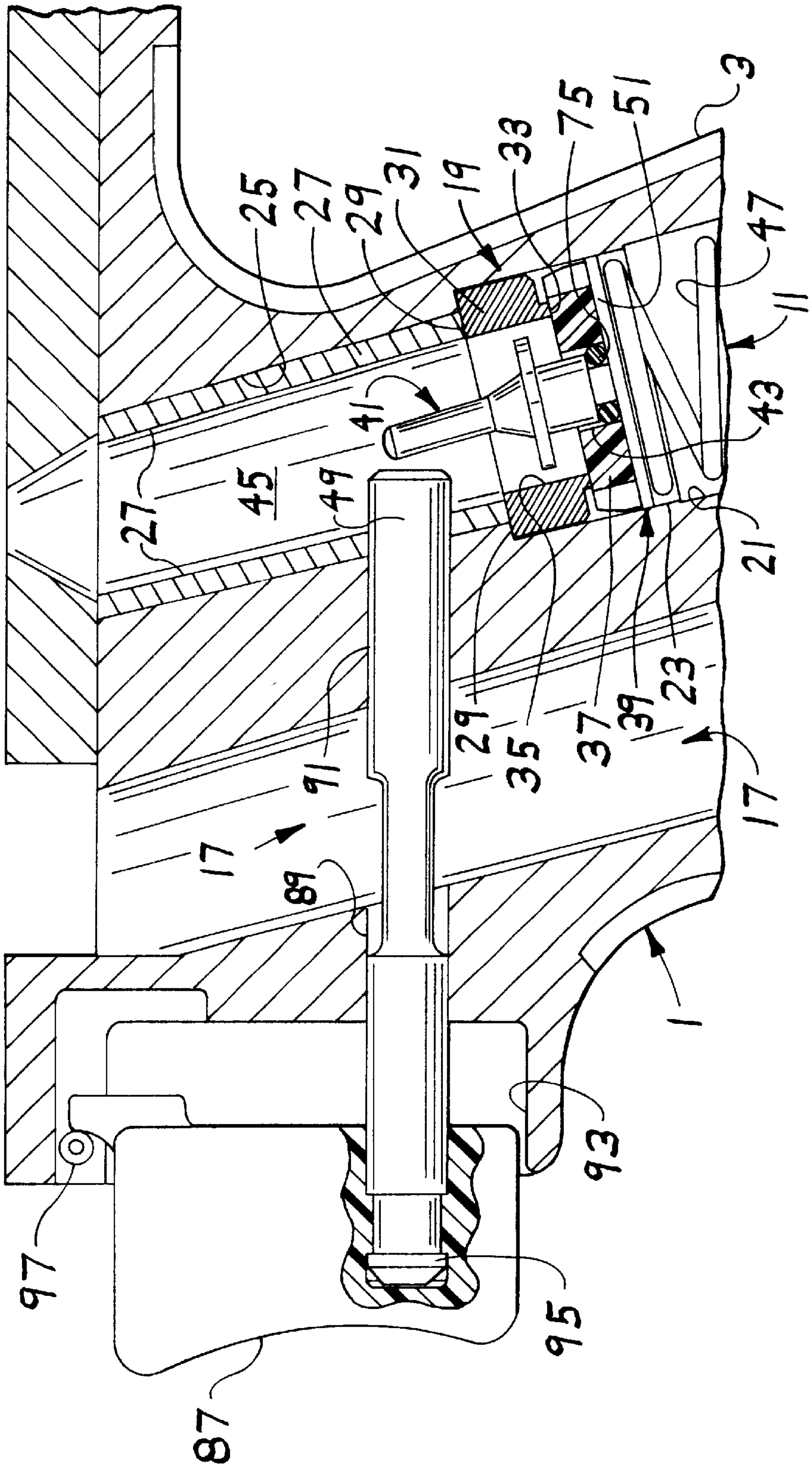
FIG. 2 is an enlarged fragment of FIG. 1.
Figure 3:
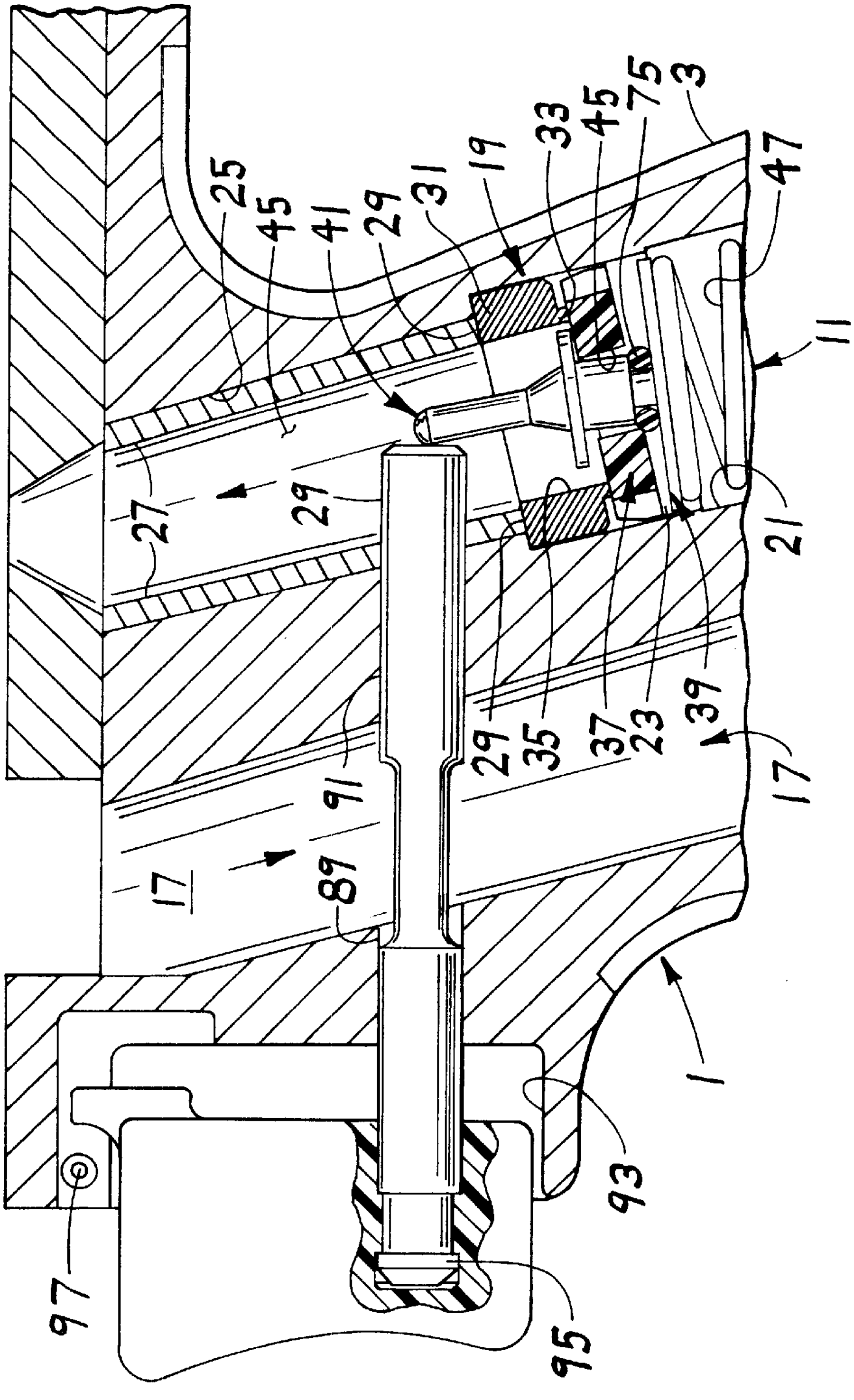
FIG. 3 is a view similar to FIG. 2 illustrating the valve means in a low-flow position.
Figure 4:
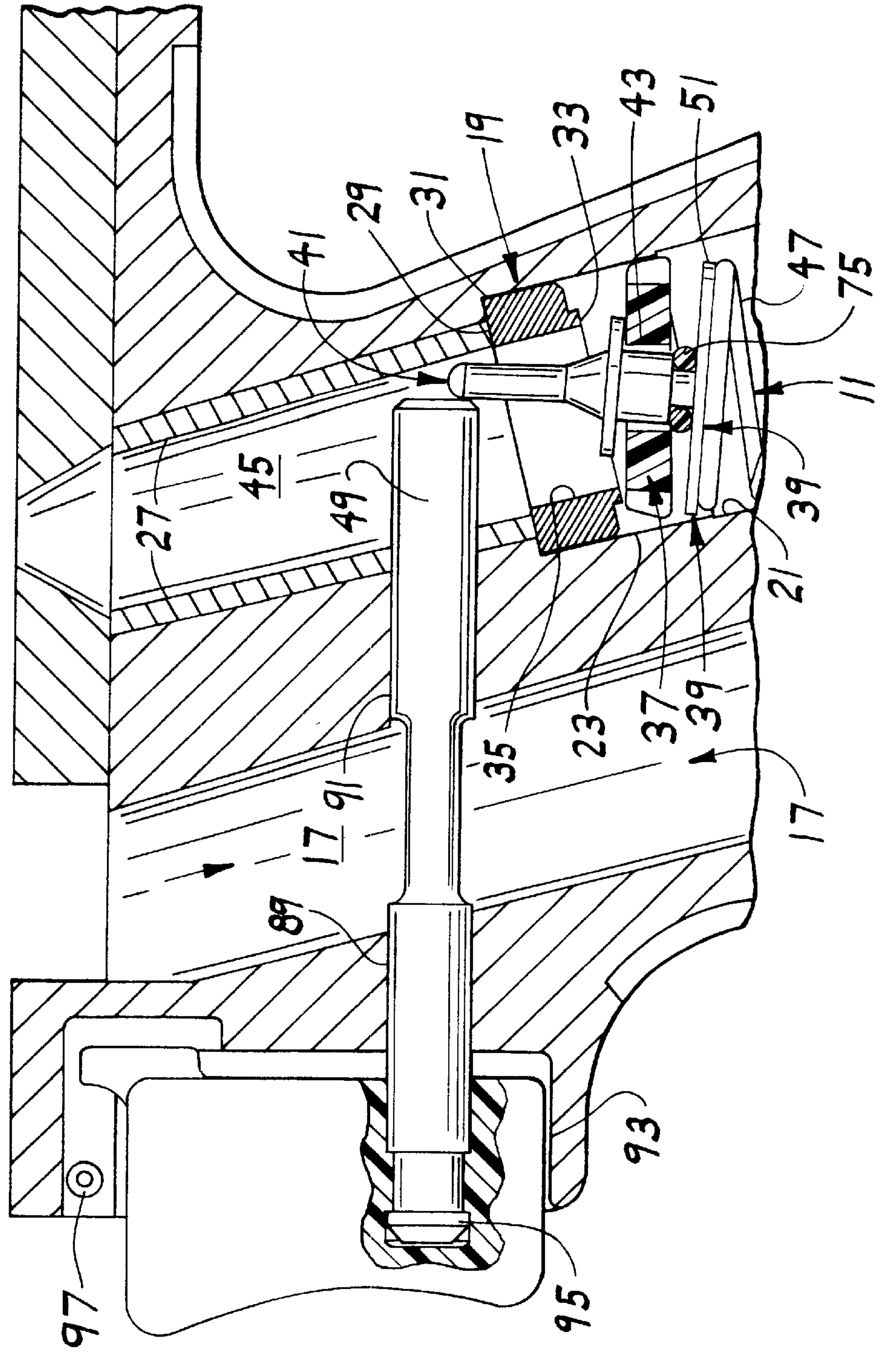
FIG. 4 is a view similar to FIGS. 2 and 3 illustrating the valve means in a high-flow position.

The valve means 19 comprises in association with the valve seat 33 two valve members generally designated 37 and 39, respectively in the inlet passage upstream of the seat 33, one of which, namely the member 39, has a stem generally designated 41 extending downstream therefrom through a central opening 43 in the other member, namely member 37, through the central opening 35 in the bossed ring 31, and up into the space 45 in the inlet passage 11 downstream of the ring 31 (the space in insert 27). A spring 47 biases the members 39 and 37 in downstream direction (in the direction toward the seat 33) to the closed position in which they are illustrated in FIGS. 1 and 2 wherein the stem 41 extends generally axially in downstream direction in the inlet passage 11. At 49 is indicated a trigger-operated rod which constitutes a deflector for the stem 41 operable by one holding the tool for deflecting the stem angularly from its aforesaid generally axial position to a first angularly deflected (tilted) position such as that in which it is shown in FIG. 3 wherein the valve members 37 and 39 establish flow of air to the motor 7 at a relatively low rate for low-speed operation of the motor, and deflecting the stem farther to a second angularly deflected (tilted) position, such as that in which it is shown in FIG. 4, wherein the valve members establish flow of air to the motor at a relatively high rate for high-speed operation of the motor.

Figure 5:
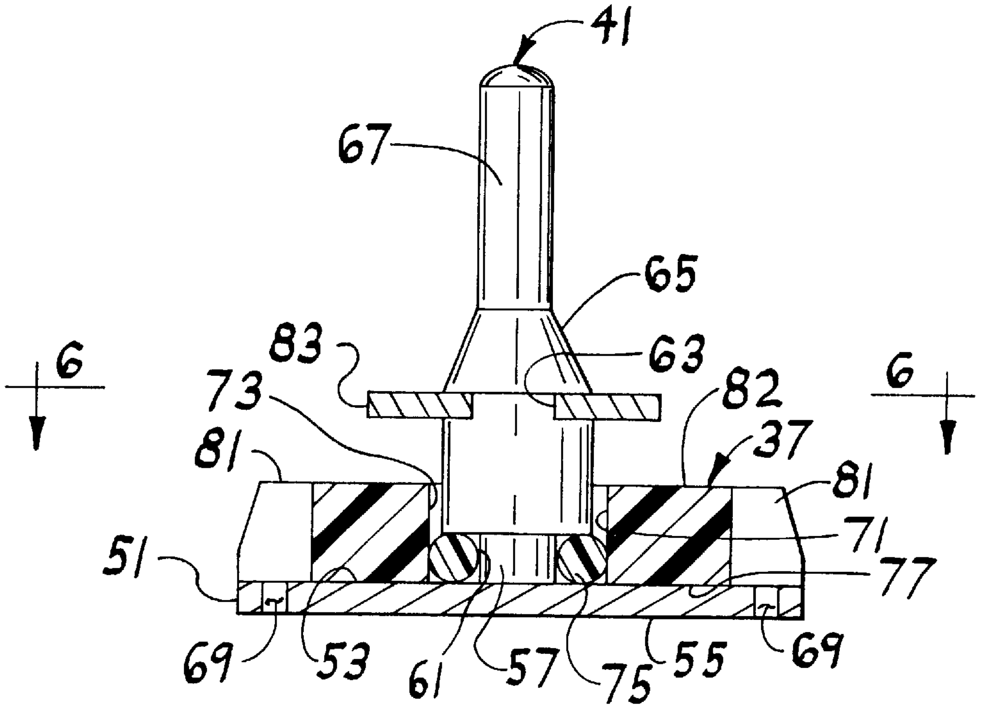
FIG. 5 is an enlarged view with parts shown in section of an assembly per se of components of the valve means.
Figure 6:
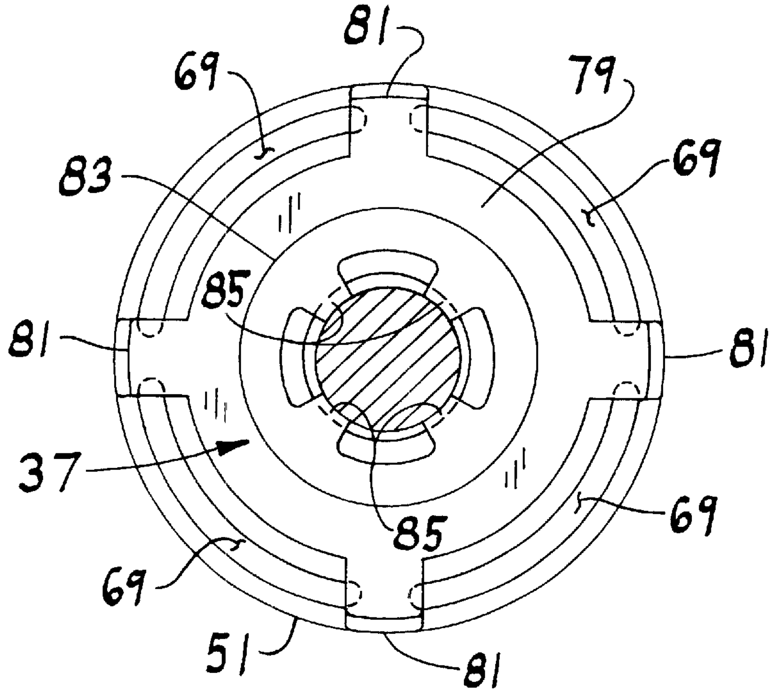
FIG. 6 is a view generally in section on line 6—6 of FIG. 5.

The valve member 39, the one having the stem 41 extending downstream therefrom, comprises a disk 51, preferably of sheet metal, having a downstream face designated 53 and an upstream face designated 55 (see FIG. 5). The stem 41 extends downstream from the downstream face 53 generally from the center thereof. Referring more particularly to FIG. 5, the stem 41 has a relatively short upstream portion 57 of circular cross-section immediately adjacent the disk 51, a somewhat longer portion 59 of circular cross section and of larger diameter than portion 57 immediately downstream of (above) portion 57 forming an annular groove 61 around portion 57 between the lower end of portion 59 and the disk 51. At the downstream (upper) end of portion 59 the stem 41 has an annular groove 63. Downstream of the groove 63, the stem has a tapered portion 65 widening in downstream direction from an upper relatively long portion 67 of circular cross-section of relatively small diameter. The diameter of the disk 51 is slightly less than the diameter of the counterbore 23, the disk, in its closed position fitting somewhat loosely therein generally in a plane at right angles thereto. Referring more particularly to FIG. 6, the disk is shown as having a plurality (e.g. four) arcuate slots 69 extending on a circle adjacent its periphery constituting ports for flow of air as will be subsequently described.

The second of the two valve members, namely the member 37, comprises a generally annular or ring-shaped member positioned between the downstream face 53 of the disk 51 and the valve seat 33. This annular member 37 has the generally central opening 43. The stem 41 extends downstream from disk 51 through this opening surrounding portion 59 of the stem, the opening 43 being of larger diameter than portion 59 to provide an annular passage 73 for flow of air upward around portion 59 as will be subsequently described. An O-ring 75 in groove 61 in the stem seals the upstream (lower) end of said passage 73 in the closed position of the valve members 37 and 39 in which they are shown in FIGS. 1 and 2 with the lower face 77 of member 37 in flatwise engagement with the upper face 53 of disk 51 and maintains the annular member 37 generally centered (i.e. coaxial) with respect to portion 59 of the stem. Annular member 37 is shown (FIG. 6) as having a main ring-shaped portion 79 of circular outline, the diameter of which is somewhat greater than that of valve seat 33, with a plurality of radially outwardly extending projections 81, e.g. four such projections at 90° intervals.

The spring 47 presses upwards on the disk 51 and thereby biases the disk downstream toward member 37 and, via the disk, biases member 37 toward the closed position of FIGS. 1 and 2 against the valve seat 33. In detail, the upper face 53 of the disk engages the lower face 77 of member 37 and the upper face 82 of member 37 engages the seat. The stem 41 has a part 83 thereon spaced downstream of member 37 when the stem is in the generally axial position of FIGS. 1 and 2 (and FIG. 5), this part, which is constituted by a flat (e.g. sheet metal) ring or collar on the stem at the lower end of the taper having inwardly directed teeth 85 snapped into the groove 63 in the stem, having a function to be described.

The trigger-operated rod 49 extends from the trigger 87 of the tool across the exhaust passage 17 in openings indicated at 89 and 91 into the space 45 where its inner end is engageable with the stem 41 adjacent the upper end of the stem (the upper end of portion 67 of the stem). The trigger 87 is slidable in a cavity 93 in the forward side of the grip 3 adjacent the upper end of the grip. The forward end of the rod 49 is secured in the trigger as indicated at 95. Forward (outward) movement of the trigger is limited by a stop 97. Rod 49 is slidably guided in the openings 89 and 91. Without pull on the trigger, as illustrated in FIGS. 1 and 2, the valve means 19 under the bias of spring 47 is held in the closed position wherein member 37 engages the seat 33 and the stem 41 is in a generally axial position extending generally centrally (axially) within the inlet passage 11. The rod 49 is generally in position retracted from the stem 41, having been pushed out to this position by the stem under the spring bias; thus the trigger 87 is in forward position determined by its engagement with the stop 97. By pulling (squeezing) the trigger 87 to push the rod 47 inward a limited distance within a limited range, readily sensed by the user pulling the trigger, the rod (acting as a deflector for the stem 41) deflects the stem angularly (i.e. tilts the stem) from its generally axial position of FIGS. 1 and 2 to a first angularly deflected (tilted) position such as shown in FIG. 3 without moving member 37 away from the valve seat 33. While part 83 (the flat collar) on the stem angles down toward the member 37, it stops short of moving member 37. However, on tilting of the stem 41 to said first angularly deflected position (which may be in the range from somewhat past the FIG. 2 position to the FIG. 3 position in which the collar 83 is contiguous to member 37), the disk 51 is angled down away from member 37, opening up a relatively restricted path for flow of air at a relatively low rate through the ports 69 in the disk 51 to the space opened up between the downstream face 53 of disk 51 and the upstream face 77 of member 37, thence through the annular space 73 and up around the flat collar 83, the central opening 35 in ring 31 to the upper space 45 in the inlet passage 11. The O-ring 75 moves down with disk 51 to open up space 73.

By pulling (squeezing) the trigger 87 to push rod 49 farther inward than above described, the stem 41 is still farther angularly deflected (tilted) as shown in FIG. 4 resulting in part 83 (the flat collar) on the stem engaging and moving valve member 37 away from the valve seat 33 thereby establishing relatively high-rate flow of air through the inlet passage 11 to the motor 7. The high-rate flow is generally via the ports 89 in disk 51 (and to some extent around the disk 51), thence through the spaces at the periphery of member 37 between projections 81, around collar 83 and through the opening 35 in ring 31.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A pneumatic rotary hand tool comprising a housing having an air motor therein, said housing having an inlet passage for flow of air to the motor for driving it, a valve for controlling the flow of air through the inlet passage, said inlet passage having a upstream-facing valve seat, said valve comprising members in the passage upstream of the seat one of which has a stem extending downstream therefrom past the seat, a spring biasing said members in downstream direction to a closed position, said stem extending generally axially in said passage in said closed position of said members, a deflector for the stem operable by one holding the tool for deflecting the stem angularly from said generally axial position to a first angularly deflected position wherein said valve members establish flow of air to the motor at a relatively low rate for low-speed operation thereof and farther to a second farther angularly deflected position wherein said valve members establish flow of air to the motor at a relatively high rate for high-speed operation thereof, said one of said members having upstream and downstream faces, said stem extending downstream from its downstream face generally from the center thereof, a second one of said members comprising a generally annular member positioned between the downstream face of said one member and the valve seat, said annular member having a generally central opening and said stem extending downstream through said opening past the seat, said spring biasing said one member downstream toward said second member and biasing said second member toward said closed position against said seat, said stem having a part thereon spaced downstream of said second member when the stem is in its said generally axial position, said part being movable with the stem as said stem is deflected from its said generally axial position to said first angularly deflected position without moving said second member away from the seat, said one member being angled away from said second member as said stem is deflected from its said generally axial position to said first angularly deflected position for said low-rate flow between said members and through the generally central opening of said second member, said part moving said second member away from said seat on farther deflection of the stem to said second angularly deflected position to establish said relatively high-rate flow past said second member, said part extending radially outwardly from the stem.

2. A pneumatic rotary hand tool as set forth in claim 1 wherein said one member comprises a disk having said upstream and a downstream face, said annular member having an downstream face engageable with said seat and a upstream face engageable by the downstream face of the disk.

3. A pneumatic rotary hand tool as set forth in claim 2 wherein said stem has a portion extending upward through the central opening of the annular member with an annular space around said portion.

4. A pneumatic rotary hand tool as set forth in claim 3 wherein said part on the stem comprises a sheet metal ring snap-fitted in an annular groove in the stem.

5. A pneumatic rotary hand tool as set forth in claim 4 having a seal in a groove in the stem for the lower end of said annular space.

6. A pneumatic rotary hand tool as set forth in claim 5 wherein the disk has a plurality of ports therein spaced therearound adjacent its periphery.

7. A pneumatic rotary hand tool as set forth in claim 1 wherein said part comprises a ring extending radially outwardly from the stem.

8. A pneumatic rotary hand tool as set forth in claim 7 wherein the ring has flat upstream and downstream surfaces.

9. A pneumatic rotary hand tool comprising a housing having a pistol grip and a chamber above the grip, an air motor in said chamber having a shaft for a tool extending out of said chamber, an air inlet passage extending through the grip for flow of air to the motor for driving it, an air exhaust passage extending through the grip for exit of air from the motor, a valve for controlling the flow of air through the inlet passage new, said inlet passage having a upstream-facing valve seat, said valve comprising members in the inlet passage upstream of the seat one of which has a stem extending downstream therefrom past the seat, a spring biasing said members in downstream direction to a closed position with respect to the seat, said stem extending generally axially in said inlet passage in said closed position of said members, said housing having a trigger for operation by a user gripping the tool by the grip, a rod extending from the trigger movable in the grip having an inner end engageable with the stem, said trigger being operable by one holding the tool by the grip for moving the rod inwardly for deflecting the stem angularly from said generally axial position to a first angularly deflected position wherein said valve members establish flow of air to the motor at a relatively low rate for low-speed operation thereof and farther to a second farther angularly deflected position wherein said valve members establish flow of air to the motor at a relatively high rate for high-speed operation thereof, said one of said members having upstream and downstream faces, said stem extending downstream from its downstream face generally from the center thereof, a second one of said members comprises a generally annular member positioned between the downstream face of said one member and the valve seat, said annular member having a generally central opening and said stem extending downstream through said opening past the seat, said spring biasing said one member downstream toward said second member and biasing said second member toward said closed position against said seat, said stem having a part thereon spaced downstream of said second member when the stem is in its said generally axial position, said part being movable with the stem as said stem is deflected from its said generally axial position to said first angularly deflected position without moving said second member away from the seat, said one member being angled away from said second member as said stem is deflected form its said generally axial position to said first angularly deflected position for said low-rate flow between said members and through the generally central opening of said second member, said part moving said second member away from said seat on farther deflection of the stem to said second angularly deflected position to establish said relatively high-rate flow past said second member, said part extending radially outwardly from the stem.

10. A pneumatic rotary hand tool as set forth in claim 9 wherein said one member comprises a disk having said upstream and a downstream face, said annular member having an downstream face engageable with said seat and a upstream face engageable by the downstream face of the disk.

11. A pneumatic rotary hand tool as set forth in claim 10 wherein said stem has a portion extending upward through the central opening of the annular member with an annular space around said portion.

12. A pneumatic rotary hand tool as set forth in claim 11 wherein said part on the stem comprises a sheet metal ring snap-fitted in an annular groove in the stem.

13. A pneumatic rotary hand tool as set forth in claim 12 having a seal in a seal in a groove in the stem for the lower end of said annular space.

14. A pneumatic rotary hand tool as set forth in claim 13 wherein the disk has a plurality of ports therein spaced therearound adjacent its periphery.

15. A pneumatic rotary hand tool as set forth in claim 9 wherein said part comprises a ring extending radially outwardly from the stem.

16. A pneumatic rotary hand tool as set forth in claim 15 wherein the ring has flat upstream and downstream surfaces.

17. A pneumatic rotary hand tool comprising a housing having an air motor therein, said housing having an inlet passage for flow of air to the motor for driving it, a valve for controlling the flow of air through the inlet passage, said inlet passage having a upstream-facing valve seat, said valve comprising members in the passage upstream of the seat one of which has a stem extending downstream therefrom past the seat, a spring biasing said members in downstream direction to a closed position, said stem extending generally axially in said passage in said closed position of said members, a deflector for the stem operable by one holding the tool for deflecting the stem angularly from said generally axial position to a first angularly deflected position wherein said valve members establish flow of air to the motor at a relatively low rate for low-speed operation thereof and farther to a second farther angularly deflected position wherein said valve members establish flow of air to the motor at a relatively high rate for high-speed operation thereof, said one of said members having upstream and downstream faces, said stem extending downstream from its downstream face generally from the center thereof, a second one of said members comprising a generally annular member positioned between the downstream face of said one member and the valve seat, said annular member having a generally central opening and said stem extending downstream through said opening past the seat, said stem having a portion extending upward through the central opening of the annular member with an annular space around said portion, the stem having a groove therein, the valve further including a seal in the groove received in the lower end of said annular space when the valve is in said axial position.

18. A pneumatic rotary hand tool comprising a housing having an air motor therein, said housing having an inlet passage for flow of air to the motor for driving it, a valve for controlling the flow of air through the inlet passage, said inlet passage having a upstream-facing valve seat, said valve comprising members in the passage upstream of the seat one of which has a stem extending downstream therefrom past the seat, a spring biasing said members in downstream direction to a closed position, said stem extending generally axially in said passage in said closed position of said members, a deflector for the stem operable by one holding the tool for deflecting the stem angularly from said generally axial position to a first angularly deflected position wherein said valve members establish flow of air to the motor at a relatively low rate for low-speed operation thereof and farther to a second farther angularly deflected position wherein said valve members establish flow of air to the motor at a relatively high rate for high-speed operation thereof, said one member comprising a disk having upstream and downstream faces, a second of said members comprising an annular member having an downstream face engageable with said seat and a upstream face engageable by the downstream face of the disk, the disk having a plurality of ports therein spaced therearound adjacent its periphery.

* * * * *